United States Patent [19]
Tupolev et al.

[11] 3,900,178
[45] Aug. 19, 1975

[54] SUPERSONIC AIRCRAFT WITH A DELTA WING

[76] Inventors: Andrei Nikolaevich Tupolev, Leninsky prospekt, 14; Alexei Andreevich Tupolev, ulitsa Stanislavskogo, 15, kv. 25; Kurt Vladimirovich Minkner, Leninsky prospekt, 30, kv. 159; Alexandr Romanovich Bonin, naberezhnaya M. Gorkogo, 28/30, kv. 33; Georgy Alexeevich Cheremukhin; Valentin Ivanovich Bliznjuk, all of Moscow; Alexandr Leonidovich Pukhov, Zhukovsky Moskovskoi Oblasti; Georgy Petrovich Svischev; Georgy Sergeevich Bjushgens, both of Moscow; Alexandr Vasilievich Nikolaev; Vitaly Georgievich Mikeladze, both of Zhukovsky Moskovskoi Oblasti, all of U.S.S.R.

[22] Filed: Apr. 10, 1972

[21] Appl. No.: 242,717

Related U.S. Application Data

[63] Continuation of Ser. No. 18,048, March 10, 1970, abandoned.

[30] Foreign Application Priority Data
Mar. 10, 1969 U.S.S.R.............................. 1348852

[52] U.S. Cl................................. 244/55; 244/53 B
[51] Int. Cl............................................ B64d 27/00
[58] Field of Search...... 244/53 B, 53 R, 55, 100 R, 244/102 R, 120, 43, 13, 15

[56] References Cited
UNITED STATES PATENTS
2,562,778  7/1951  Egly.................................... 244/102
3,171,619  3/1965  Alesbury......................... 244/102 R OTHER PUBLICATIONS
Russians Show Refinements in TU-144 Design–Aviation Week & Space Technology–June 26, 1967.
Concord–Flight International–May 18, 1967–pp. 811–813.
Soviet Display New TU-144 Model In U. K.–Aviation Week & Space Technology–Aug. 19, 1968–pp. 18–19.

*Primary Examiner*—Trygve M. Blix
*Assistant Examiner*—Charles E. Frankfort
*Attorney, Agent, or Firm*—Holman & Stern

[57] ABSTRACT

A supersonic aircraft provided with a delta wing which can be most successfully used under the conditions of an endurance flight at supersonic speed in which a pair of engine nacelles is mounted under the wing and disposed near the aircraft longitudinal axis, with the nacelles being arranged symmetrically relative to the longitudinal axis. The air intake ducts are made autonomous and are disposed in one nacelle at the nearest distance possible relative to the similar ducts in the other nacelle, and with the distance between the ducts appropriately chosen, their mutual influence is eliminated.

8 Claims, 8 Drawing Figures

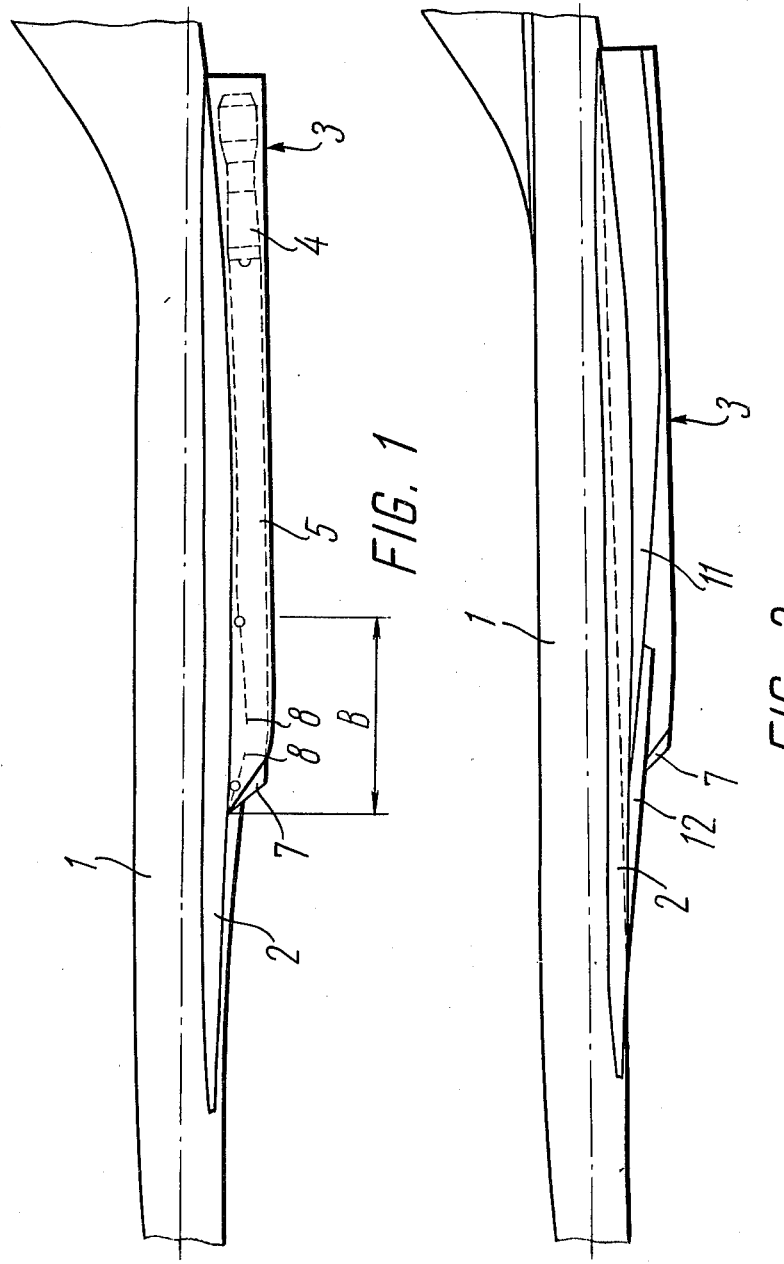

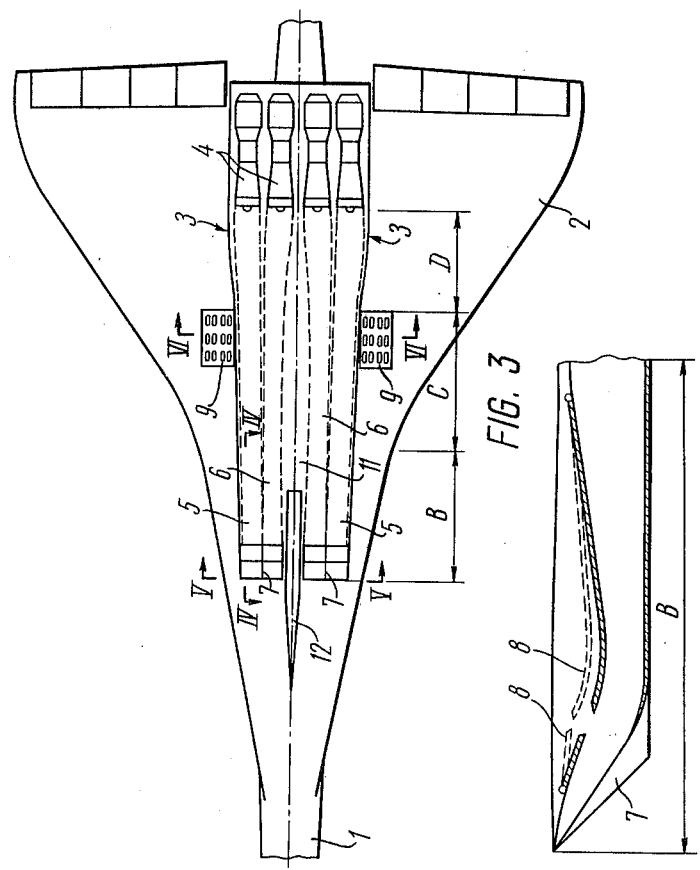

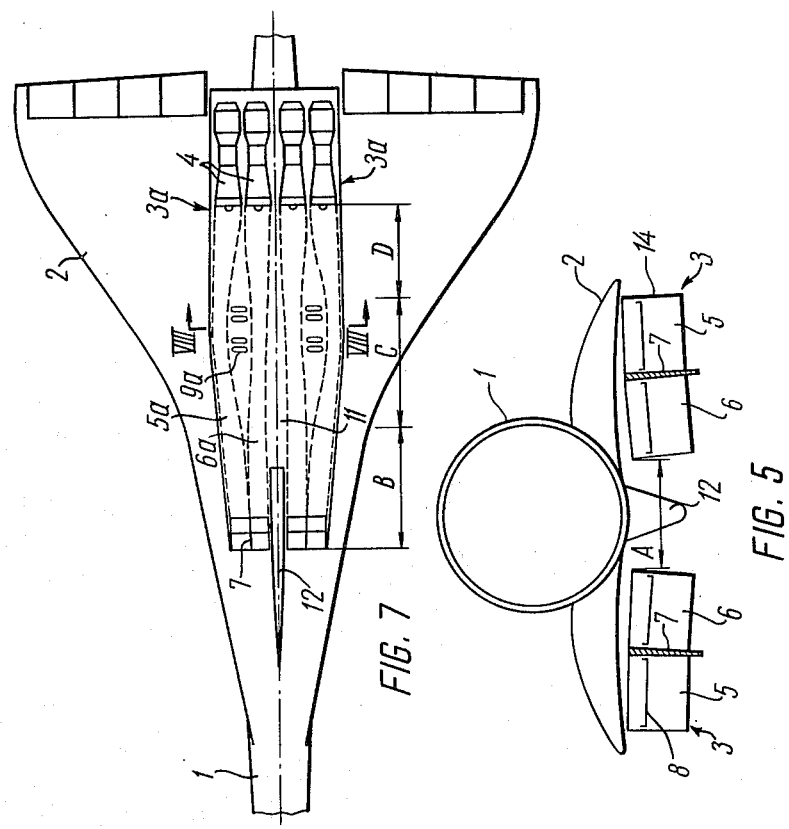

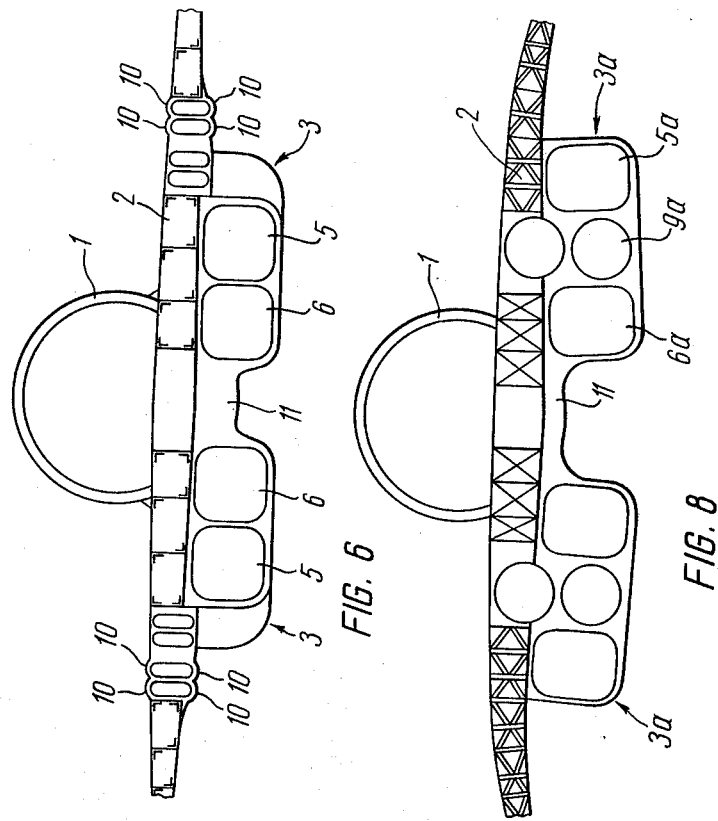

SUPERSONIC AIRCRAFT WITH A DELTA WING

This is a continuation of U.S. Application Ser. No. 18,048, filed Mar. 10, 1970 now abandoned.

BACKGROUND OF THE INVENTION

The present invention relates to supersonic aircraft provided with a delta wing and which aircraft can be most successfully used under the conditions of an endurance flight at a supersonic speed.

As it is known, for a supersonic aircraft, the most economical flight condition is the cruising one when the aerodynamic characteristics and the efficiency of the power plant whose air intake ducts must have relatively high coefficients of the intake pressure recovery, are of great importance. The most effective are two-dimensional air intake ducts which are mounted under the wing and in which the turnable panels are built into the front portion of the upper wall. The operation of such ducts depends on their shape, length and disposition relative to the leading edge of the wing, the aircraft longitudinal axis, and the engines.

It is also known that the aerodynamic characteristics of the aircraft depend on the disposition of the landing gear relative to the nacelles accommodating the engines and their air intake ducts.

Known in the art is a supersonic aircraft having two nacelles which are arranged symmetrically under the wings, with each nacelle being mounted in the middle portion of the wing relative to its span, and accommodating two engines mounted therein and provided with autonomous air intake ducts. The partition separating the duct protrudes beyond the front portion of the nacelle, and the turnable panels are mounted in the upper portion of each duct (cf. the journal Flight International, May 18, 1967, pp.811–813).

Although this aircraft has a relatively high coefficient of intake pressure recovery, the field of speeds before the engines thereof is relatively non-uniform due to an insufficient length of the air intake ducts, determined by a relatively small chord of the wing at the point of their disposition, and a great range of the change of the upwash angle which is characteristic for the portion of the wing where the nacelle is disposed. As the nacelles are spaced from the aircraft longitudinal axis for a rather great distance, in case of failure of even one engine, the aircraft moves aside under the action of the thrust of the engine arranged symmetrically relative to the failed engine. Furthermore, this disposition of the nacelles does not make it possible to dispose the aircraft control means on the trailing edge of the wing behind the nacelles, and to impart to the wing an optimal curve and twist.

In the known supersonic aircraft, the landing gear is spaced from the nacelles for over a rather great distance, which creates a relatively great additional aerodynamic resistance. To decrease this resistance, use is made of multiwheel landing gears which are raised in flight and closed both from upwardly and downwardly, with two flat fairings (cf. the GFR journal Flugwelt, No.8, 1966, p.633).

The aerodynamic resistance of the aircraft is substantially decreased in case the engines are disposed under the wing near the aircraft longitudinal axis, with the point of disposition of the landing gear being of certain significance. It is known to dispose the landing gear within the boundaries of the nacelle (cf. the journal Flight International, July 2, 1964, pp. 22 and 23).

In the known aircraft having the engines disposed in the above-described manner near the aircraft longitudinal axis, three engines having a common air intake duct made as a two-directional one in its front portion, are mounted near the aircraft longitudinal axis at each side, with the turnable panels in each duct being built into its side wall. At the point of disposition of the landing gear, the outer side wall of the air intake duct is spaced from the outer side wall of the nacelle which brings about a great warping of the duct resulting in the air flow separation, and consequently, distortion of the fields of speeds before the engine. Moreover, in the case of employment of a common air intake duct, a change in the mode of operation of one of the engines results in undesirable changes of the fields of speeds and pressures before the other engines. The common duct also makes it more difficult to start the engines.

It is an object of the present invention to eliminate the above said difficulties.

OBJECT AND SUMMARY OF THE INVENTION

The main object of the present invention is to provide such a supersonic aircraft with a delta wing which would have nacelles mounted near the aircraft longitudinal axis and accommodating four engines provided with autonomous air intake ducts, with the distance between the nacelles being relatively small.

This object is accomplished by means of a supersonic aircraft having a delta wing under which a pair of nacelles accommodating engines and autonomous air intake ducts are mounted near the aircraft longitudinal axis, and with the upper wall of the front portion of the ducts having turnable panels mounted therein. According to the present invention, the smallest distance between the front portion of the air intake duct in one nacelle, which is the nearest to the aircraft longitudinal axis, and the similar portion of the air intake duct in the other nacelle, which is the nearest to the axis, constitutes 1.35–1.70 of the width of this duct.

The disposition of the air intake ducts at a maximum short distance from the aircraft longitudinal axis, i.e. the zone where the upwash angle changes but slightly, allows the provision in the ducts of good fields of speeds and pressures.

In a preferred variant of the embodiment of the aircraft, it is expedient to make the front portion of the air-intake duct in each nacelle, which is the nearest to the aircraft longitudinal axis, including the portion accommodating the turnable panels, rectilinear in plan, and to dispose the same at an angle of 1.0–1.5° relative to the axis, and with the angle peak facing the aircraft nose. This angle corresponds to the average value of the upwash angle at the point of disposition of the portion of the air intake duct.

If it is necessary to dispose the landing gear outside the nacelles, it is expedient to make the air intake ducts in each nacelle in such a manner that the ratio between the height and the width is 1.0:1.0—1.2, and that the same abut one another at least up to the middle of their length, starting with the front end. Farther, the ducts are somewhat divergent, as a result of which the nacelle becomes wider in the direction of the fin. This embodiment of the air intake ducts makes it possible, by having disposed the landing gear near the front portion of each nacelle until it becomes wider, to retract the landing gear into the wing at the point where it has a relatively great thickness. In addition, this embodiment of the ducts decreases with wing resistance due to the positive interference of the waves at the expanding nacelle.

However, even this portion of the wing cannot provide for a complete accommodation of the landing gear in the wing, and, therefore, it is desirable to envisage separate cambers on the upper and lower surfaces of the wing for every protruding element of the landing gear.

For the above mentioned variant of the disposition of the landing gear in the vicinity of the nacelles, it is expedient to take the smallest distance between the front portion of the air intake duct in one nacelle, which is the nearest to the longitudinal axis of the aircraft, and the similar portion of the air intake duct in another nacelle, which is the nearest to the axis, equal to 1.40 of the axis, equal to 1.40 of the width of this duct.

The aerodynamic resistance of the aircraft is substantially decreased provided the landing gear is accommodated in the nacelle between the air intake ducts, so that it is desirable to make these ducts in such a manner that the ratio between the height and the width is 0.6–1.0:1.0, and to space the same apart in their middle portions.

Provided the front portion of the outer air intake duct in each nacelle, including the portion accommodating the turnable panels, is made rectilinear approximately along a third part of the duct length starting with the front end, and is disposed at an angle of 1.5°–2.5° relative to the similar portion of the adjacent air intake duct, with the angle peak facing the aircraft nose, the ducts are of a smooth shape.

The value of the angle is chosen dependent upon the conditions of the air flowing about the wing.

Irrespective of the disposition of the landing gear relative to the air intake ducts, it is expedient to provide a body adjoining the wing and located below the lower surface of the wing along the section between the nacelles, the lower surface of the body in the region of the front portions of a nacelle having a convex shape for increasing the strength, this does not practically increase the aerodynamic drag of the aircraft, since the area of each cross section of the body is inversely proportional to the distance between the nacelles.

The influence exercised by the air intake ducts of one nacelle upon the air intake ducts of another nacelle will be quite insignificant, in case a rib directed from the nose to the fin is provided on the wing lower surface along the portion extending from the nose up to the nacelles and farther in between the latter.

A substantial advantage of the present invention is that it is possible to obtain the coefficients of the intake pressure recovery as high as 0.92–0.93, and, with number M being 2.2, the aerodynamic ratio of the aircraft as high as 9.0–9.5.

The following detailed description of exemplary embodiments of the supersonic aircraft according to the invention is given with reference to the accompanying drawings, in which:

BRIEF DESCRIPTION OF THE DRAWINGS

FIG. 1 is a fragmentary side view of a supersonic aircraft, according to the invention;

FIG. 2 is a view in longitudinal section;

FIG. 3 is a bottom view;

FIG. 4 is a section taken along line IV—IV of FIG. 3, the view looking in the direction of the arrows and being on an enlarged scale;

FIG. 5 is a section taken along line V—V of FIG. 3, the view looking in the direction of the arrows;

FIG. 6 is a section taken along line VI—VI of FIG. 3, the view looking in the direction of the arrows;

FIG. 7 is a bottom view of another embodiment of the aircraft and;

FIG. 8 is a section taken along line VIII—VIII of FIG. 7, the view looking in the direction of the arrows.

Disposed under a fuselage 1 (FIGS. 1–3) of a supersonic aircraft is a delta wing 2 and mounted under the wing 2 near the aircraft longitudinal axis is a pair of engine nacelles 3 arranged symmetrically relative to the longitudinal axis. Each of the nacelles 3 accommodates two engines 4 (FIGS. 1 and 3) and autonomous air intake ducts, namely outer and inner ducts 5 and 6 respectively mounted therein and having a common partition 7 protruding beyond the limits of the front ends in these ducts with the autonomous air intake ducts servicing each of the engines. Mounted in the upper wall of each of the ducts 5 or 6, at the front end thereof, are turnable panels 8 (FIGS. 1 and 4).

The smallest distance, i.e. the gap A (FIG. 5), between the nose portion of the inner air intake duct 6 in one nacelle 3 and the similar portion of the inner air intake duct 6 in the other nacelle 3 equals 1.35–1.70 of the width of this duct in this portion. This size of the gap A provides for an independent operation of the nacelles, and makes it possible to locate the front portions of the air intake ducts 5 and 6 in the zone where the upwash angle varies but insignificantly. As a result thereof, good fields of speeds and pressures are provided in the ducts.

The front portion B (FIG. 3) of each inner air intake duct 6 including, the portion accommodating the turnable panels 8, is made rectilinear in plan, and is disposed at an angle of 1.0°–1.5° relative to the aircraft longitudinal axis, with the angle peak facing the nose of the aircraft. This angle corresponds to the average value of the upwash angle at the point of disposition of the front end of each of the inner air intake ducts 6.

In accordance with the first variant of the embodiment, aircraft landing gear 9 (FIG. 3) is disposed near the outer air intake ducts 5, at the end of the middle portion C thereof, this being done in order to retract the landing gear into the wing 2 in its portion which is of a relatively great thickness. To make the ducts 5 and 6 more compact along their width, the ratio between the height and the width is taken to be 1.0:1.0–1.2, and the ducts proper in each of the nacelles 3 abut each other at least until the center of its length, starting with the front portion. Farther, in the tail portion the ducts are somewhat divergent, as a result of which the nacelle becomes wider in the direction of the fin. The landing gear 9 is disposed in a zone before the portion D. And this embodiment of the ducts decreases the wave resistance of the wing due to the useful interference of the waves at the expanding engine nacelle.

When in its retracted position, the landing gear is almost completely hidden, although some of the wheels extend beyond the wing limits. To decrease the aerodynamic resistance of the protruding elements of the landing gear, the lower and upper surfaces of the wing are provided with separate cambers 10 (FIG. 6) for every protruding element.

In the case of an embodiment in which the landing gear is disposed near the nacelles, it is expedient to make the gap A (FIG. 5) equal to 1.40 of the width of this duct, i.e. closer to the smaller limit.

The aerodynamic resistance of the aircraft is substantially decreased in the other variant of the aircraft (FIGS. 7 and 8). In this variant the air intake ducts 5a and 6a are made such that the portion between the height and the width is 0.6–1.0:1.0, and they are divergent in the middle portion. This arrangement of the ducts makes it possible to dispose the landing gear 9a between the ducts 5a and 6a in each nacelle 3a. To make the shape of the ducts smooth, the front portion B of the outer air intake duct 5a in each nacelle, including the portion accommodating the turnable panels, is made rectilinear along approximately a third part of the duct length, starting with the front end poriton and is disposed at an angle of 1.5°–2.5° relative to the similar portion of the adjacent air intake duct 6a, with the angle facing the nose of the aircraft. The value of this angle corresponds to the average upwash angle.

In accordance with all of the possible embodiments of the aircraft, a body 11 is provided under the wing and adjoining it, in the space between the nacelle (FIGS. 2, 3 and 6-8), or surface 13 of the body in the region of the front portions of the nacelles is convex for increasing the strength, which, does not practically to the distance between the nacelles.

In order to completely eliminate the influence exercised by the air intake ducts in one nacelle upon the air intake ducts in the other nacelle, a rib 12 (FIGS. 2, 3, 5, 7 and 8), directed from the nose to the fin is mounted on the lower surface of the wing along a portion extending from the nose to the nacelles and farther in between the latter.

What we claim is:

1. A supersonic aircraft provided with a thin delta wing, comprising a pair of nacelles each of which nacelles accommodates two engines and two autonomous air intake ducts for servicing the engines, said necelles being mounted under the wing near the longitudinal axis of the aircraft and arranged symmetrically relative to the longitudinal axis; the front portion of one of the air intake ducts disposed in one of said nacelles, which is the nearest to the longitudinal axis, being spaced from a similar portion of one of the air intake ducts disposed in the other nacelle, which is the nearest to the longitudinal axis, over a minimal distance equalling 1.35–1.70 of the width of the duct each said autonomous air intake duct including turnable panels, in which the front portion of the air intake duct which is nearest to the longitudinal axis of the aircraft in each of said nacelles, including the portion accommodating said turnable panels, is rectilinear in plan, and is disposed at an angle of 1.0°–1.5° relative to the longitudinal axis, with the angle peak facing the nose of said aircraft.

2. The aircraft according to claim 1, including landing gear in which in said air intake ducts of each of said nacelles, the ratio between the height and the width is 1:1.0–1.2, and said ducts abut one another at least up to the middle of their length, starting with the front end, for enabling the landing gear to be disposed outside said nacelles.

3. The aircraft according to claim 2, in which the landing gear has protruding elements, the upper and lower surfaces of the wing being provided with separate cambers for the protruding elements of said landing gear.

4. The aircraft according to claim 1, in which the smallest distance between the front portion of the air intake duct which is the nearest to the longitudinal axis of the aircraft in one nacelle and a similar portion of the air intake duct, which is the nearest to said longitudinal axis, in the other nacelle equals 1.40 of the width of the duct.

5. The aircraft according to claim 1, including landing gears in which in said air intake ducts in each of said nacelles the ratio between the height and the width is 0.6–1.0:1.0, and said ducts are divergent from each other in their middle portion to dispose said landing gear between these ducts.

6. The aircraft according to claim 5, in which the front portion of the outer air intake duct of said air intake ducts disposed in each of said nacelles, the portion accommodating the turnable panels included, is made rectilinear approximately over one third of the duct length, beginning with the front end, and is disposed at an angle of 1.5°–2.5° relative to the similar portion of the adjacent air intake duct of said air intake ducts, the angle peak facing said nose of said aircraft.

7. The aircraft according to claim 1, in which below the lower surface of the wing along the portion between said nacelles, there is located a body adjoining the wing, the lower surface of the body at the front portions thereof having a convex shape, with the area of each cross section of the body being inversely proportional to the distance between said nacelles.

8. The aircraft according to claim 1, including a fin and in which a rib directed from the nose to the fin is provided on the lower surface of the wing along a portion extending from the nose to the nacelles and farther in between the latter.

* * * * *